United States Patent [19]

Hummel

[11] 4,279,190

[45] Jul. 21, 1981

[54] BREAK AWAY NAIL

[76] Inventor: Philip H. Hummel, 28 Pawnee Ave., Oakland, N.J. 07436

[21] Appl. No.: 54,999

[22] Filed: Jul. 5, 1979

[51] Int. Cl.³ .................... F16B 15/00; F16B 15/08
[52] U.S. Cl. ................................... 411/487; 411/451
[58] Field of Search .................. 85/28, 23, 10 R; 10/DIG. 4

[56] References Cited

U.S. PATENT DOCUMENTS

| 391,109 | 10/1888 | Bellanger | 85/10 R |
|---|---|---|---|
| 1,428,247 | 9/1922 | Morris . | |
| 2,874,603 | 2/1959 | Boettcher | 85/28 |
| 3,099,108 | 7/1963 | Kalkbrenner | 85/23 X |
| 3,205,757 | 9/1965 | Kuennen | 85/28 X |

FOREIGN PATENT DOCUMENTS

| 1121117 | 4/1956 | France | 85/28 |
|---|---|---|---|
| 164 | 6/1953 | Philippines | 85/28 |
| 749257 | 5/1956 | United Kingdom | 10/DIG. 4 |

Primary Examiner—James T. McCall
Attorney, Agent, or Firm—Gloria K. Koenig

[57] ABSTRACT

A nail having a shank and head including one or more spaced grooves formed in the shank about its periphery, such that the nail can be fractured.

The groove may comprise any one of several configurations, e.g. rectangular, V-shaped, concave, etc. in cross-section. The essence of the invention is to provide the nail shank with a reduced circumference at one or more locations along its length so that the nail portion above the reduced portion nearest the head will break off on impact from the side, thus leaving the remainder of the nail shank in place.

2 Claims, 5 Drawing Figures

BREAK AWAY NAIL

BACKGROUND OF THE INVENTION

1. Field of the Invention

In various instances where a nail has been used to hold a member in place, such as a roof shingle, it is desirable to remove that member which means that the nail(s) first has to be removed. In the case of nailed-down roof shingles on a plywood base, as the shingles deteriorate a further layer of shingle is usually nailed over the initial layer. However, the number of layers is generally limited by fire and building construction regulations and codes which necessitate removal of the layer of shingles. Other times it is required or desirable to remove a nailed-in-place member, as for example, the removal of shingles in the case of fire. The normal way of removing a shingle is to pry it up, often leaving the nail heads exposed or requiring substantial effort to remove them completely or to hammer each nail so that the head is flush with the surface.

2. Description of the Prior Art

The Morris U.S. Pat. No. 1,428,247 discloses a nail having circumferential grooves for retaining a cement coating to aid in holding the nail in place. Boettcher's U.S. Pat. No. 2,874,603 illustrates a double-headed nail having a narrow tapered portion with webs to facilitate breaking off the extension from the normal nail.

SUMMARY OF THE INVENTION

The present invention relates to an improved nail which is breakable at least at one point between the nail head and opposite end thereof.

A nail constructed according to the present invention comprises a head and shank, and includes at least one reduced portion along the shank such that the nail head can be broken off easily, if desired, by a lateral blow. The reduced portion may comprise a groove having any one of several cross-sectional configurations such as rectangular, V-shaped, concave, and the like, as long as the depth of the groove permits relatively easy fracturing of the nail while still affording adequate strength to enable the nail to be used and drive in its normal intended manner without breaking. There can be provided a plurality of grooves spaced along the shank so that the nail can be broken in any one of several locations along its length.

Such a nail affords considerable advantages over the prior art. Not only does it have economic benefits by saving labor time required for nail or shingle removal, it also makes the laborer's task easier such as in the case of laying a new roof. An important advantage of this invention is that the roofer does not have to hammer in or to extract any exposed nails left in place when the old shingles are removed. The fractured shanks lie close enough to the plywood base, that new shingles may be nailed directly over the fractured shanks without causing damage to the new shingles. Various other benefits and advantages of the present invention will become apparent after reading this disclosure.

DESCRIPTION OF THE PREFERRED EMBODIMENTS

Figure 1:
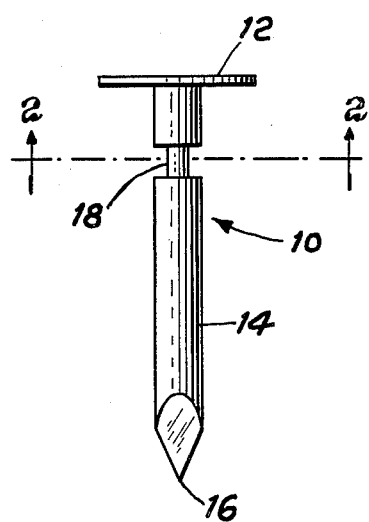
FIG. 1 is an elevational view of a nail constructed according to this invention, having a single peripheral groove.
Figure 2:
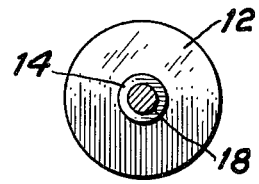
FIG. 2 is a sectional view taken on line 2—2 of FIG. 1.

Referring to FIG. 1, there is shown a nail 10 having a head 12, a shank 14 and a point 16 opposite from the head. These are the main parts of any conventional nail. The point functions as a wedge as the nail is driven, while the head covers the hole made during the driving process. In accordance with the present invention a reduced portion in the form of a groove 18 is provided at a location along the shank. Typically the groove is located nearer the head end of the nail so that the holding function is still retained even if the portion between the groove and head is fractured. The peripheral groove 18 is of sufficient depth to enable fracturing of the nail if desired. The nail according to this invention can have any of several standard shapes and may be of any size or material so long as the groove is properly formed to enable the heretofore described fracturing.

Figure 3:
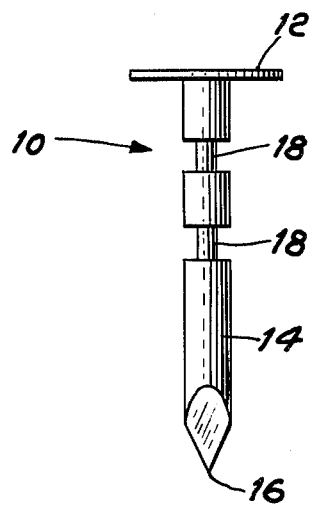
FIG. 3 is another embodiment of the invention wherein the nail has more than one peripheral groove.

The groove 18 or reduced portion may be made by a machining process, by milling, by pressure or the like, whereby the shank is reduced in diameter at one or more locations. As shown in FIG. 3, there may be a plurality of peripheral grooves at spaced locations along the shank, so that the nail can be fractured at any one of these locations. In addition to enabling the nail head to be broken off, if the nail happens to extend through a member and it is desired to break-off the protruding portion near the point 16 then a lateral blow will break off that part.

Figure 4:
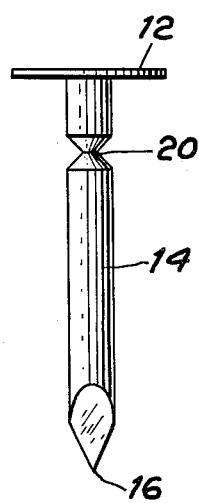
FIG. 4 is a typical configuration of the groove formed in the nail shank.
Figure 5:
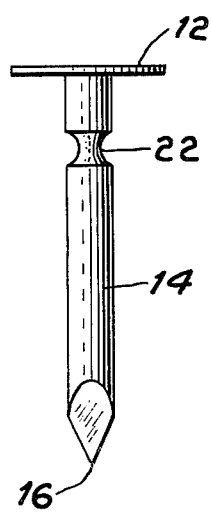
FIG. 5 is another typical configuration of the groove formed in the nail shank.

The groove also can have any of several cross-sectional configurations as best illustrated in FIGS. 4 and 5. The groove in FIG. 1 is substantially rectangular in respect to the longitudinal axis of the shank, although it can be tapered into a V-shaped notch 20 (FIG. 4) or have a concave shape 22 (FIG. 5). These latter shapes are advantageous in that they give greater driving strength to the nail with a maximum reduced portion (i.e. greatest depth) in comparison to the uniform depth grooves or recesses of FIGS. 1 and 3.

Having thus set forth the nature of the invention, what is claimed herein is:

1. A nail comprising a single head and a shank of predetermined length terminating at a first end in said head for use in driving said nail into place and a second end opposite said first end, at least a first reduced portion along said shank constructed so that said nail fractures in response to a lateral force of predetermined strength, wherein said reduced portion comprises a completely open peripheral channel shaped groove having side walls extending outwardly from the longitudinal axis of the nail shank and disposed at right angles to the longitudinal axis of said nail shank.

2. The nail of claim 1 including a plurality of reduced portions spaced along said shank between said head and said second end.

* * * * *